(12) United States Patent
Okada et al.

(10) Patent No.: US 7,129,984 B1
(45) Date of Patent: Oct. 31, 2006

(54) ELECTRONIC DEVICE USING OPERATING SYSTEM FOR OVERALL APPARATUS CONTROL INCLUDING MECHANICAL OPERATION

(75) Inventors: Masaki Okada, Yokohama (JP); Keihiro Kurakata, Kodaira (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/414,104

(22) Filed: Oct. 7, 1999

(30) Foreign Application Priority Data

Oct. 8, 1998 (JP) ............................... 10-286132
Jul. 30, 1999 (JP) ............................... 11-218084

(51) Int. Cl.
*H04N 5/225* (2006.01)
*H04N 5/262* (2006.01)
*H04N 9/04* (2006.01)
*G03B 17/04* (2006.01)

(52) U.S. Cl. ............ 348/372; 348/207.99; 348/240.99; 396/348

(58) Field of Classification Search ........... 348/333.13, 348/372, 240, 207.99
See application file for complete search history.

(56) References Cited

U.S. PATENT DOCUMENTS 4,521,678 A * 6/1985 Winter ........................ 250/568
5,309,195 A * 5/1994 Goo et al. .................... 396/302
5,721,987 A * 2/1998 Ozawa ........................ 396/302
6,115,064 A * 9/2000 Mogi ........................ 348/240.3
6,157,394 A * 12/2000 Anderson et al. ......... 348/211.6
6,229,954 B1 * 5/2001 Yamagami et al. ......... 386/117
6,356,307 B1 * 3/2002 Ohkawara et al. .......... 348/345
6,441,854 B1 * 8/2002 Fellegara et al. ........... 348/372
2003/0151728 A1 * 8/2003 Nishi .......................... 355/30

FOREIGN PATENT DOCUMENTS

JP  06-095754 A  *  4/1994
JP  10-260440     *  9/1998

* cited by examiner

Primary Examiner—David Ometz
Assistant Examiner—Nhan T. Tran
(74) Attorney, Agent, or Firm—Morgan & Finnegan, L.L.P.

(57) ABSTRACT

A control method for an electronic device such as a digital camera, having a mechanical driving member comprising a collapsible barrel, a lens barrier and the like, which performs mechanical operations, and a system controller which controls the overall device including the mechanical driving member is provided. In accordance with turning on of power supply to the system controller, the mechanical driving member is driven until the device enters a main-operation stand-by status, in parallel to start of an OS by the system controller.

45 Claims, 12 Drawing Sheets

ELECTRONIC DEVICE USING OPERATING SYSTEM FOR OVERALL APPARATUS CONTROL INCLUDING MECHANICAL OPERATION

BACKGROUND OF THE INVENTION

The present invention relates to an electronic device which uses an OS (Operating System) to perform control, including mechanical operations, on the overall apparatus, such as a digital camera having a collapsible image sensing lens and a barrier to protect the image sensing lens.

A controller of an electronic device such as a digital camera performs various controls for image sensing and the like, and performs various processing such as file management, communication with an external device, image processing and image compression. To realize the above processing, an OS is installed in a controller which controls the overall apparatus. In addition, in a digital camera, as downsizing is seriously needed, the lens is collapsible to be housed within the camera main body, to improve portability. Further, a lens-protective barrier is provided to protect the lens.

However, in the above-described conventional art where the OS is installed in the controller that controls the overall electronic device, it takes relatively long time to start the OS when the power of the electronic device is turned on.

Further, in the digital camera, it takes time for mechanical operations to open the lens-protective barrier and extend the lens to an image sensing initial position. Accordingly, as it takes considerable time for the mechanical operations in addition to the above OS starting time before the camera enters an image sensing stand-by status, a user of the camera may miss a shutter release opportunity.

SUMMARY OF THE INVENTION

The present invention has been made in consideration of the above situation, and has its object to provide an electronic device which quickly enters its main-operation stand-by status within a short period and a driving method for the electronic device. For example, if the electronic device is a digital camera, when the power is turned on, it quickly enters an image sensing stand-by status within a short period.

According to the present invention, the foregoing object is attained by providing an electronic device comprising: a mechanical driving member which performs mechanical operations; a first system controller which controls the overall device including the mechanical driving member; and a second system controller, operating independently of the first system controller, which controls a part of the device, wherein in accordance with turning on of power supply to the first system controller, the second system controller controls the mechanical driving member in parallel to a control preparatory operation for control on the overall device by the first system controller.

According to the present invention, the foregoing object is also attained by providing a method for controlling an electronic device having a mechanical driving member which performs mechanical operations and a system controller which controls the overall device including the mechanical driving member, the method comprising: a preparatory step of performing a control preparatory operation for control on the overall device by the system controller, in accordance with turning on of the power supply to the system controller; and a mechanical drive step of controlling the mechanical driving member in parallel to the preparatory step.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
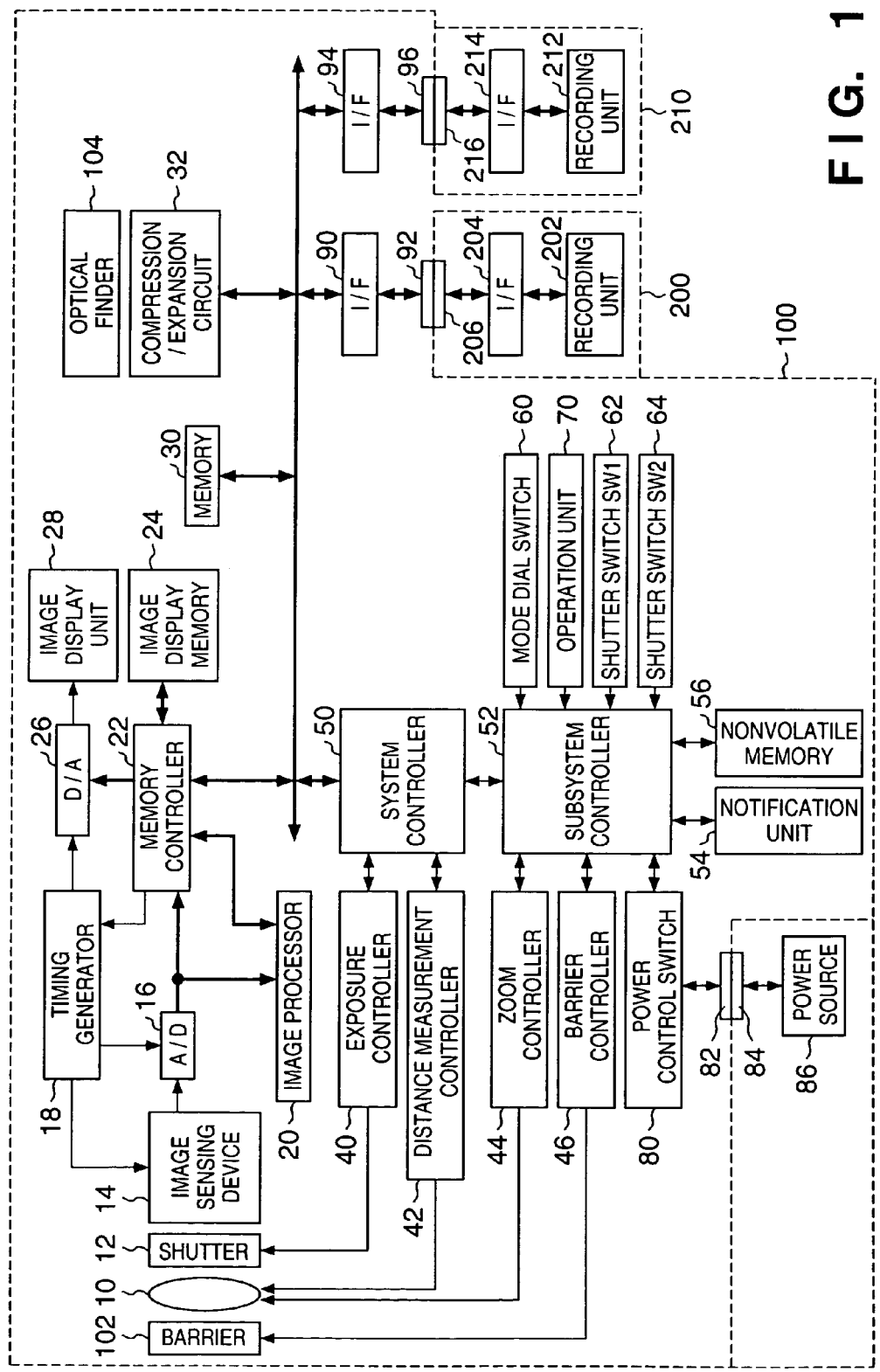
FIG. 1 is a block diagram of the arrangement of principal constituents of a digital still camera according to a first embodiment of the present invention.

FIG. 1 is a block diagram showing principal constituents and peripheral elements of a digital still camera as an electronic device according to an embodiment of the present invention. In FIG. 1, reference numeral 100 denotes an image processing apparatus; 10, an image sensing lens (or collapsible barrel); 12, a shutter having a diaphragm function; 14, an image sensing device which converts an optical image into an electric signal; and 16, an A/D converter which converts an analog signal output from the image sensing device 14 into a digital signal.

Further, numeral 18 denotes a timing generator which supplies a clock signal and a control signal respectively to the A/D converter 16 and a D/A converter 26, under the control of a memory controller 22 and a system controller 50. Numeral 20 denotes an image processor which performs predetermined pixel interpolation processing, color conversion processing and the like on image data from the A/D converter 16 or image data from the memory controller 22. The image processor 20 performs predetermined calculation processing using the image data outputted from the A/D converter 16, and the system controller 50 performs through-the-lens (TTL) auto focus (AF) processing, auto exposure (AE) processing, pre-flash (EF) processing with respect to an exposure controller 40 and a distance measurement controller 42, based on the result of calculations. Further, the image processor 20 performs predetermined calculation using the image data outputted from the A/D converter 16, and performs TTL auto white balance (AWB) processing, based on the result of calculations.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

Numeral 28 denotes an image display unit comprising an LCD or the like. Image data written into the image display memory 24 is displayed on the image display unit 28 via the D/A converter 26. An electronic finder function is realized by sequentially display obtained images on the image display unit 28. Further, image display unit 28 arbitrarily turns ON/OFF its display, in accordance with an instruction from the system controller 50. If the display is turned OFF, the electric consumption of the image processing apparatus 100 can be greatly reduced.

The memory 30, used for storing obtained still images and moving images, has a sufficient storage capacity for storing a predetermined number of still images and a moving image for a predetermined period. In sequential image sensing to sequentially obtain a plural number of still images or panoramic images sensing, a large amount of image data can be written into the memory 30 at a high speed. Further, the memory 30 may be used as a work area for the system controller 50.

The compression/expansion circuit 32 compresses or expands image data by adaptive discrete cosine transformation (ADCT) or the like. The compression/expansion circuit 32 reads image data stored in the memory 30 and performs compression or expansion processing on the read image data, and writes the processed data into the memory 30.

The exposure controller 40 controls the shutter 12 having the diaphragm function. The distance measurement controller 42 controls focusing of the image sensing lens 10. Numeral 44 denotes a zoom controller which controls zooming of the image sensing lens 10. Numeral 46 denotes a barrier controller which controls the operation of a barrier 102 to protect the lens 10. As described above, the system controller 50 controls the exposure controller 40 and the distance measurement controller 42 by the TTL method, in accordance with the result of calculations by the image processor 20 based on the image data from the A/D converter 16.

The system controller 50 controls the overall image processing apparatus 100. Numeral 52 denotes a subsystem controller which controls an operation power source to the system controller 50, detects operation key inputs, controls a liquid crystal display, extension/collapse of the lens. If no key input operation is made within a predetermined period, the subsystem controller 52 turns off the power supply to the system controller 50 to conserve electricity, and thereafter, restarts the system controller 50 when a key input operation is made.

Numeral 54 denotes a notification unit which notifies operating statuses, messages and the like to the outside by using characters, images, sound and the like, in correspondence with execution of program by the system controller 50. The notification unit 54 comprises one or more combinations of display devices including an LCD and an LED for visual notification and sound generating devices for audio notification. Especially, the display device or devices is/are provided in a single or plural visually-recognizable positions around an operation unit 70 of the image processing apparatus 100. Further, a part of functions of the notification unit 54 is provided within an optical finder 104. To perform the visual notification, an instruction from the system controller 50 is transmitted to the subsystem controller 52 by communication, and the subsystem controller 52 controls the display device or devices in accordance with the instruction.

The display contents of the notification unit 54, displayed on the LCD or the like, include indication of single shot/sequential image sensing, a self timer, a compression rate, the number of recording pixels, the number of recorded images, the number of recordable images, a shutter speed, an f number (aperture), exposure compensation, flash illumination, pink-eye effect mitigation, macro image sensing, a buzzer-set state, a timer battery level, a battery level, an error state, information of plural digit numbers, attached/detached status of recording media 200 and 210, operation of communication I/F, and date and time.

Further, the display contents of the notification unit 54, displayed within the optical finder 104, include a focus state, a camera shake warning, a flash charge state, the shutter speed, the f number (aperture), and the exposure compensation.

Numeral 56 denotes an electrically erasable and recordable nonvolatile memory such as an EEPROM.

Numerals 60, 62, 64 and 70 denote operation means for inputting various operation instructions to the system controller 50, comprising a single or plurality of combinations of switches, dials, touch panels, a device for pointing by line-of-sight detection, a voice recognition device, and the like. The subsystem controller 52 detects the operation content and transmits the content to the system controller 50 by communication.

Next, the operation means will be described in more detail.

Numeral 60 denotes a mode dial switch for selecting various function modes such as a power OFF mode, an automatic image sensing mode, an image sensing mode, a panoramic image sensing mode, a reproduction mode, a multi-image reproduction/deletion mode, and a PC connection mode.

Numeral 62 denotes a shutter switch SW1 turned ON by half stroke of a shutter button (not shown), to instruct start of the operations of the AF processing, the AE processing, the AWB processing, the EF processing and the like.

Numeral 64 denotes a shutter switch SW2 turned ON by full stroke of the shutter button (not shown), to instruct start of a series of operations of exposure processing to write a signal read from the image sensing device 14 into the memory 30, via the A/D converter 16 and the memory controller 22, development processing by using calculations by the image processor 20 and the memory controller 22, and recording processing to read the image data from the memory 30, compress the image data by the compression/expansion circuit 32, and write the compressed image data into the recording medium 200 or 210.

Numeral 70 denotes an operation unit comprising various buttons and touch panels including a menu button, a set button, a macro button, a multi-image reproduction/repaging button, a flash set button, a single-shot/sequential/self-timer image sensing selection button, a forward (+) menu item selection button, a backward (−) menu item selection button, a forward (+) reproduction image search button, a backward (−) reproduction image search button, an image sensing quality selection button, an exposure compensation button, and a date/time set button.

Next, the respective constituents connected to the image processing apparatus 100 and respective attachments will be described.

Numeral 80 denotes a power control switch comprising a battery detection circuit, a DC—DC converter, a switch circuit to select the block to be energized and the like. The power control switch 80 detects attached/detached state of the battery, the battery type and the remaining battery power level, controls the DC—DC converter based on the results of detection and an instruction from the system controller 50, and supplies a necessary voltage to respective parts including the recording medium for the necessary period.

Numerals 82 and 84 denote connectors; and 86, the power source comprising a primary battery such as an alkaline battery or a lithium battery, a secondary battery such as an NiDd battery, an NiMH battery or an Li battery, an AC adapter, and the like.

Numerals 90 and 94 denote interfaces (I/Fs) for the recording media 200 and 210, such as a memory card, a hard disk and the like; and 92 and 96, connectors for connection with the recording media 200 and 210.

In the present embodiment, two systems of interfaces and connectors for connection with the recording media are employed. However, the number of systems is not limited, and a single or plurality of systems interfaces and connectors may be provided. Further, interfaces and connectors pursuant to different standards may be combined.

As the interfaces and connectors, cards in conformity with Personal Computer Memory Card International Association standards (PCMCIA cards) and cards in conformity with compact flash (CF) card standards may be used.

In a case where cards and connectors in conformity with the PCMCIA standards, CF card standards and the like are used as the interfaces 90 and 94 and the connectors 92 and 96, image data and management information attached to the image data are transmitted/received with respect to other peripheral devices such as a computer and a printer by connection with various communication cards such as a LAN card, a modem card, a USB card, an IEEE 1394 card, a P1284 card, an SCSI card and a PHS card.

The barrier 102 covers the image sensing portion of the image processing apparatus 100 including the lens 10, thus prevents dirt and breakage of the image sensing portion.

The optical finder 104 can be used for image sensing without the electronic finder function by the image display unit 28. In the optical finder 104, realized are some of the functions of the notification unit 54 including the indication of focus state, the camera shake warning, the flash charge state, the shutter speed, the f number (aperture), the exposure compensation and the like.

The recording medium 200 comprises a memory card, a hard disk or the like. The recording medium 200 has a recording unit 202 of a semiconductor memory, a magnetic disk or the like, the interface 204 for communication with the image processing apparatus 100, and the connector 206 for connection with the image processing apparatus 100. Also, the recording medium 210 comprises a memory card, a hard disk or the like, and has a recording unit 212 of a semiconductor memory, a magnetic disk or the like, the interface 214 for communication with the image processing apparatus 100, and the connector 216 for connection with the image processing apparatus 100.

Next, the operation of the digital still camera according to the present embodiment will be described below.

Figure 2:
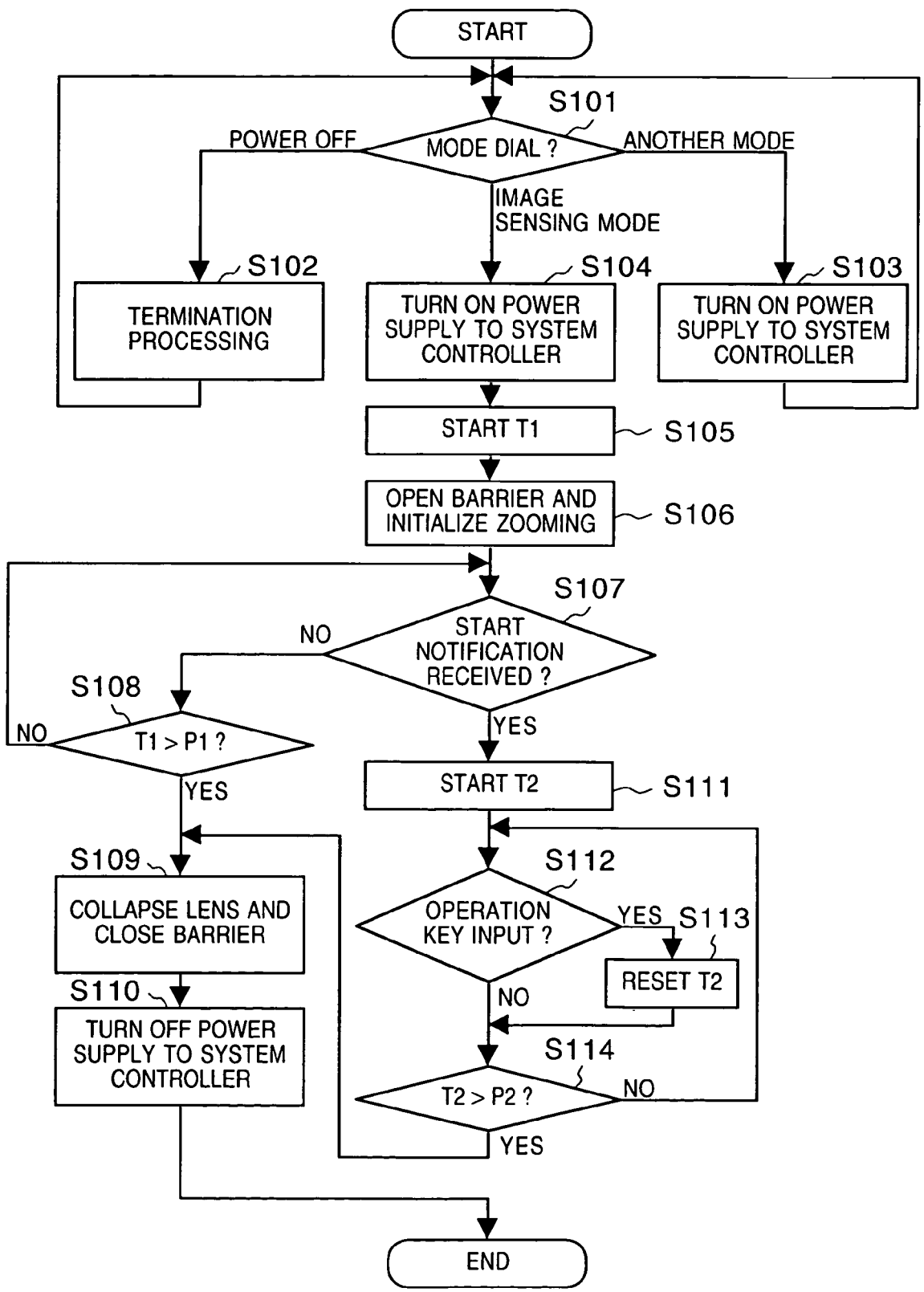
FIG. 2 is a flowchart of the main routine of a subsystem controller of an image processing apparatus according to the first embodiment.

FIG. 2 is a flowchart showing the main routine of the subsystem controller 52 of the image processing apparatus 100 according to the present embodiment.

At step S101, the position of the mode dial switch 60 is determined. If the mode dial switch 60 is set on the power OFF mode, the process proceeds to step S102. At step S102, the display of the notification unit 54 is changed to an off status, then the image sensing lens 10 is collapsed, the barrier 102 is closed to protect the image sensing portion, then necessary parameters and values including flags and control variables, and the set mode are stored into the nonvolatile memory 56. Then predetermined termination processing is performed to, e.g. cut off unnecessary power supply to the respective parts of the image processing apparatus 100 including the image display unit 28, by the power control switch 80, and power supply to the system controller 50 is stopped. Then the process returns to step S101.

If it is determined at step S101 that the mode dial switch 60 is set on another mode, the process proceeds to step S103, at which power supply to the system controller 50 is started so that the system controller 50 performs processing corresponding to the selected mode. For example, if the reproduction mode is selected, image reproduction is performed, and when the processing is completed, the process returns to step S101.

Further, if it is determined at step S101 that the mode dial switch 60 is set on the image sensing mode, the process proceeds to step S104. At step S104, power supply to the system controller 50 is started, then at step S105, a timer T1 is started, and the process proceeds to step S106. At step S106, the barrier 102 is opened by the barrier controller 46, and the image sensing lens 10 is extended to an image sensing initial state (e.g., to the wide-angle side) by the zoom controller 44.

Then, at step S107, it is determined whether or not start notification has been received from the system controller 50. If the start notification has not been received, the process proceeds to step S108, at which the value of the timer T1 started at step S105 is compared with a predetermined period P1. Note that the value of the timer T1 corresponds to a period measured since applying power supply to the system controller 50. If the value of the timer T1 is longer than the predetermined period P1, the process proceeds to step S109, while if the value of the timer T1 is not longer than the predetermined period P1, the process returns to step S107. Note that the predetermined period P1 is longer than the time necessary to get the OS ready in the system controller 50.

Next, at step S109, the image sensing lens 10 is collapsed by the zoom controller 44, and the barrier 102 is closed by the barrier controller 46. Then the power to the system controller 50 is terminated at step S110, and the process ends.

Further, if it is determined at step S107 that the start notification has been received from the system controller 50, the process proceeds to step S111, at which a timer T2 is started, then the process proceeds to step S112. At step S112, it is determined whether or not a key input operation has been made from the mode dial switch 60, the shutter switch 62 (SW1), the shutter switch 64 (SW2) or the operation unit 70. If it is determined that a key input operation has been made, the process proceeds to step S113, at which the timer T2 is reset, and the process proceeds to step S114.

At step S114, the value of the timer T2 is compared with a predetermined period P2. If the value is not longer than the predetermined period P2, the process returns to step S112, while if the value is longer than the predetermined period P2, the process proceeds to step S109. As described above, the image sensing lens 10 is collapsed by the zoom controller 44, and the barrier 102 is closed by the barrier controller 46. Then the power to the system controller 50 is terminated at step S110. Then the process ends.

Note that the predetermined period P2 compared with the value of the timer T2 is set to 1 to 10 minutes based on the battery level detected by the power control switch 80. If the battery level is sufficiently high, the predetermined period P2 is set to 10 minutes. If the battery level is at a lower limit for image sensing, the predetermined period. P2 is set to 1 minute. If the battery power is at an intermediate level, the predetermined period P2 is set in accordance with the level.

Further, by changing settings by the operation unit 70, the comparison between the value of the timer T2 and the predetermined period P2 at step S114 may be omitted so as to omit the operations at step S109 and S110.

Next, the outline of the operation of the system controller 50 will be described with reference to the flowcharts of FIGS. 3 to 5.

When the power is supplied by the subsystem controller 52 (corresponding to step S104 in FIG. 2), the hardware of the system controller 50 is initialized, and at step S201, the OS is started. The OS checks an internal memory area for the system, and searches file names, the number of files, the data amounts of the respective files, the relation among the files and the like, in an external memory area. Then the OS forms a table for management of the files and the memory. Thereafter, at step S202, a system control program is loaded and started. In the system control program, flags and control variables and the like are initialized, and start notification is transmitted to the subsystem controller 52 at step S203.

Next, at step S204, the state of the mode dial switch 60, read via the subsystem controller 52, is determined (corresponding to step S101 in FIG. 2). If the mode dial switch 60 is set on the image sensing mode, the process proceeds to step S206. If the mode dial switch 60 is set on another mode, the process proceeds to step S205, and processing corresponding to the selected mode is performed. When the processing has been completed, the process returns to step S204.

At step S206, it is determined whether or not there is a problem in the operating status of the recording medium 200 or 210 in response to the operation of the image processing apparatus 100, especially in image data recording/reproduction operation. If it is determined that the operating status has a problem (YES at step S206), the process proceeds to step S207, at which a predetermined warning by an image and/or voice message is issued by using the notification unit 54, via the subsystem controller 52. Then the process returns to step S204.

If there is no problem in the operating status of the recording medium 200 or 210 (NO at step S206), the process proceeds to step S208, at which various settings of the image processing apparatus 100 are indicated by an image and/or voice message by using the notification unit 54, via the subsystem controller 52. Note that if the image display unit 28 is ON, the various settings of the image processing apparatus 100 may be displayed as an image on the image display unit 28.

Note that in the image sensing mode, the electronic finder function by the image display unit 28 is realized by sequentially displaying data, sequentially written into the image display memory 24 through the image sensing device 14, the A/D converter 16, the image processor 20 and the memory controller 22, on the image display unit 28, via the memory controller 22 and the D/A converter 26 (through display status).

Figure 3:
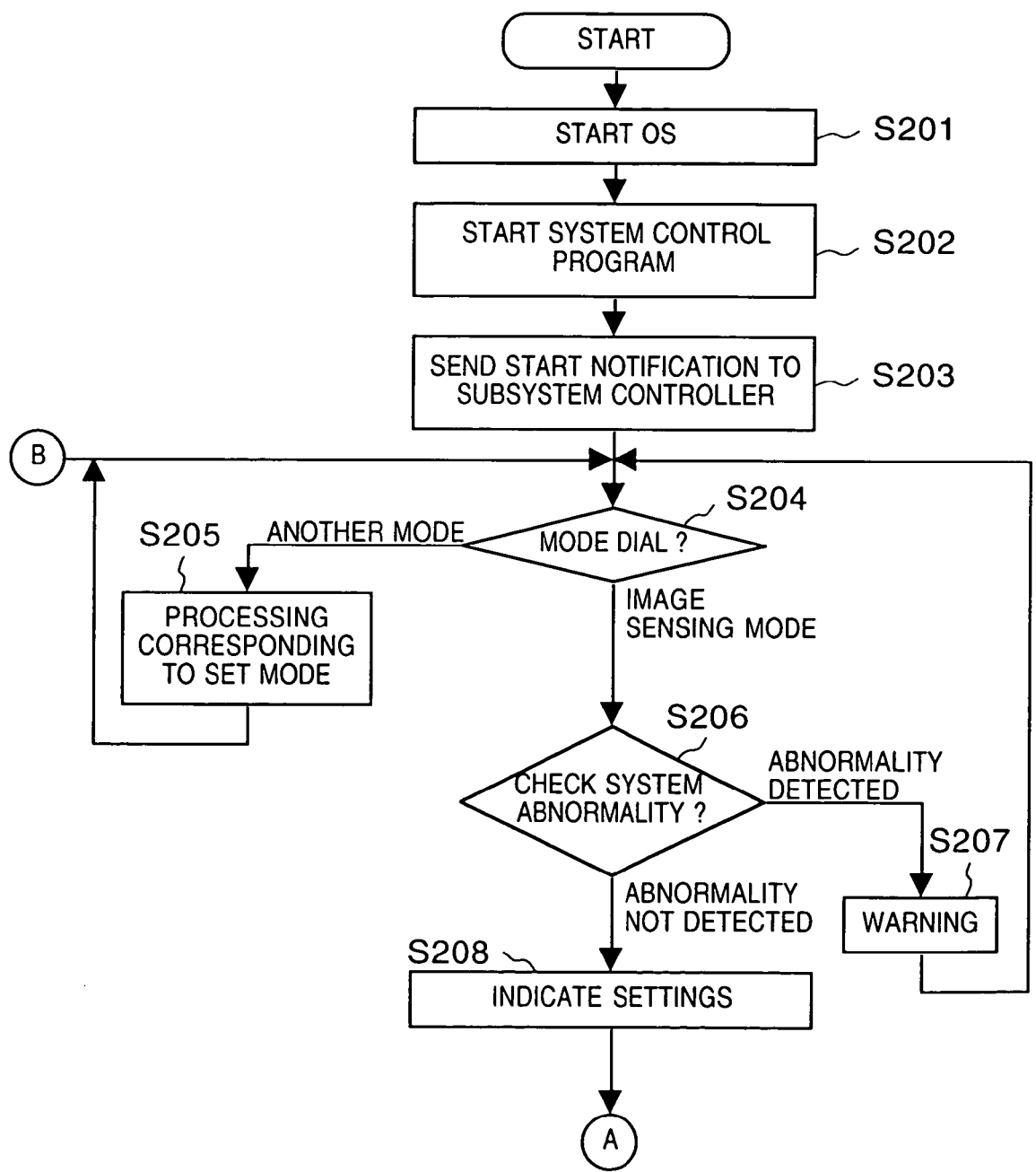
FIGS. 3 to 5 are flowcharts of the outline of the operation of a system controller of the image processing apparatus according to the first embodiment.
Figure 4:
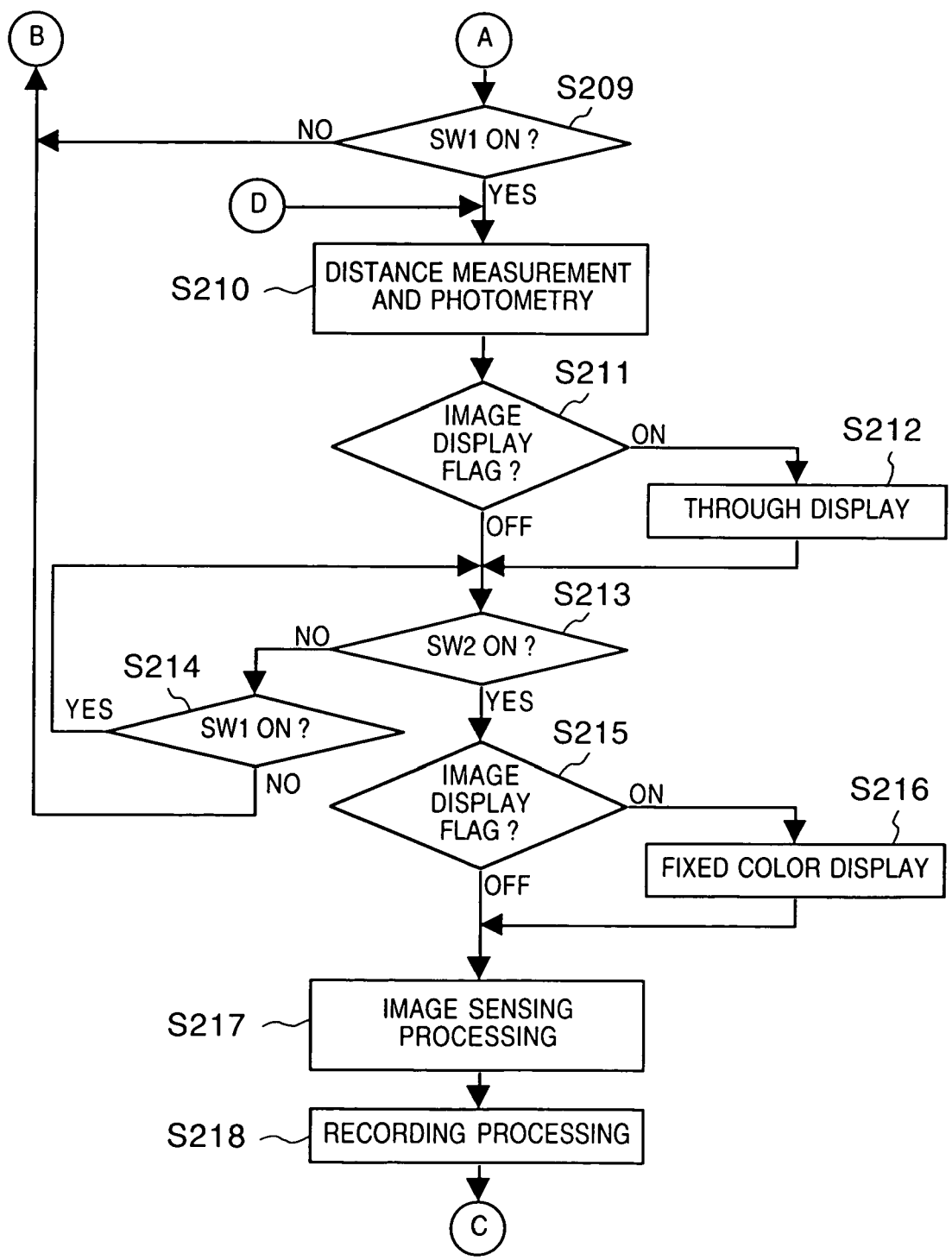

When the indication of the settings at step S208 has been completed, the process proceeds to step S209 in FIG. 4, where it is determined whether or not the shutter switch 62 (SW1) has been depressed. If it is determined that the shutter switch 62 (SW1) has not been depressed, the process returns to step S204 in FIG. 3. If it is determined that the shutter switch 62 (SW1) has been depressed, the process proceeds to step S210, at which distance measurement processing is performed, to adjust the focus of the image sensing lens 10 to obtain a sharp image of an object. Further, photometry is performed so as to determine the f value (aperture) and the shutter speed. Further, flash is set if it is determined from the photometry that flash illumination is necessary. As the distance measurement processing and the photometry processing do not particularly relate to the subject matter of the present invention, the detailed explanations of these processings will be omitted.

Thereafter, at step S211, the state of an image display flag stored in the internal memory of the system controller 50 is determined. (This memory is used for storing information from the operation unit 70 read via the subsystem controller 52. The memory may be provided as an internal memory of the subsystem controller 52, however, the location of the memory used for the information from the operation unit 70 does not particularly relate to the subject matter of the present invention, accordingly, only the internal memory of the system controller 50 is described here.) If the image flag is turned on, the display status of the image display unit 28 is set to the through display status at step S212. Then the process proceeds to step S213.

If the shutter switch 64 (SW2) has not been depressed (NO at step S213), and the shutter switch 62 (SW1) has been released (NO at step S214), the process returns to step S204. On the other hand, if the shutter switch 64 (SW2) has been depressed (YES at step S213), the state of the image display flag stored in the internal memory of the system controller 50 is determined at step S215. If the image display flag is turned on, the display status of the image display unit 28 is set to fixed-color display status at step S216.

In the fixed-color display status, in place of image data being written into the image display memory 24 via the image sensing device 14, the A/D converter 16, the image processor 20 and the memory controller 22, fixed-color image data is displayed on the image display unit 28 via the memory controller 22 and the D/A converter 26. Thus, a fixed color image is displayed on the electronic finder.

When the display status of the image display unit 28 has been set to the fixed-color display status at step S216, the process proceeds to step S217. Further, if it is determined at step S215 that the image display flag is not turned on, the process directly proceeds to the step S217.

At step S217, image sensing processing is performed through the exposure processing to write obtained image data into the memory 30 via the image sensing device 14, the A/D converter 16, the image processor 20 and the memory controller 22 or via the A/D converter 16 and the memory controller 22, and the development processing to read the image data from the memory 30 and perform various processing by using the memory controller 22 and the image processor 20 in accordance with necessity.

Since the image sensing processing at step S217 does not relate to the subject matter of the present invention, the detailed explanation of this processing will be omitted.

When the image data read out from the memory 30 has been subjected to the various processing by using the memory controller 22 and the image processor 20 in accordance with necessity and subjected to image compression processing by using the compression/expansion circuit 32 in correspondence with the set mode, the recording processing is performed to write the image data into the recording medium 200 or 210 (step S218). Note that the recording processing does not relate to the subject matter of the present invention, the detailed explanation of the processing will be omitted.

Thereafter, the process proceeds to step S219, at which the state of the image display flag stored in the internal memory of the system controller 50 is determined. If the image display flag is on, the process proceeds to step S220, at which the currently recorded image is displayed on the image display unit 28 as quick review display.

Then it is determined at step S221 whether or not the shutter switch 64 (SW2) is being depressed. In a case where the image display flag is on, the quick review display on the image display unit 28 may be continued until the shutter switch 64 (SW2) is released.

Further, if the shutter switch 64 (SW2) has been released (NO at step S221), the process proceeds to step S222 at which it is determined whether or not the image display flag is on. If the image display flag is on, the display status of the image display unit 28 is set to the through display status at step S223, and the process proceeds to step S224. In the above operation, if the image display flag is on, an obtained image can be checked by the quick review display on the image display unit 28, and the through display status to sequentially display obtained image data can be set for the next image sensing.

If it is determined at step S222 that the image display flag is not on and the through display status is set at step S223, the process proceeds to step S224, at which it is determined whether or not the shutter switch 62 (SW1) has been depressed. If it is determined that the shutter switch 62 has been depressed, the process returns to step S210 in FIG. 4, in preparation for the next image sensing. If it is determined that the shutter switch 64 (SW1) is released, the process returns to step S204 in FIG. 3 without execution of the series of image sensing operation.

As described above, in the digital still camera according to the present embodiment, comprising the system controller 50 to control the overall system and the subsystem controller 52 to control the lens-protective barrier and the lens, as constituents, when power supply to the system controller 50 is turned on, the lens-protective barrier is opened and the lens is extended to the image sensing initial position. Thus, the digital still camera quickly enters the image sensing stand-by status within a short period.

Note that the subsystem controller 52 of the present embodiment has a reduced processing speed so as to reduce electric consumption, such that it shares a role clearly different from that of the system controller 50 as a high-speed and high power-consuming element. When the digital still camera is not operational, the system controller 50 is turned off so as to lower the system electric consumption. When the digital still camera operates, the system controller 50 with a high processing speed is operated for high speed processing. Thus the reduction of electric consumption and high speed processing can be realized.

Further, in the present embodiment, the operation of the subsystem controller 52 described with reference to the flowchart of FIG. 2 is realized by the CPU, however, the operation may be realized by a hard-wired logic circuit or the like. In such a case, the hard-wired logic circuit basically transmits the respective operations of the operation means 60, 62, 64 and 70 to the system controller 50 so that the system controller 50 determines the operation with respect to the operations of the operation means. The hard-wired logic circuit receives instructions for control and indication from the system controller 50, and controls the lens, the barrier, the power source and the display in accordance with the instructions.

Note that only when the mode dial switch 60 is switched from the power OFF mode to another mode, and if the system controller 50 has returned from power down processing (so-called auto shut-off processing) since no operation input was made from the respective operation means 60, 62, 64 and 70 for a predetermined period (i.e., if power supply to the system controller 50 is restarted), the barrier 102 is opened, and the collapsed image sensing lens 10 is extended to the image sensing initial position. In this case, in correspondence with the turning on of power supply to the system controller 50, signals are outputted to the barrier controller 46 and the zoom controller 44 only during a period necessary to open the barrier and extend the collapsed lens to the predetermined position (in a case where actuators to open the barrier and drive the lens are pulse motors).

Further, if the subsystem controller 52 comprises a CPU, the subsystem controller 52 can detect whether or not the operations to open the barrier and extend the lens to the initial position have been normally completed. If the subsystem controller 52 comprises a hard-wired logic circuit, the construction can be simplified by arranging such that the system controller 50 detects whether or not the opening and moving operations of the barrier and the lens have been normally completed after the system controller 50 has been started.

Further, in a case where the subsystem controller 52 comprises a CPU as described above, upon auto shut-off processing, the barrier is closed under the control of the subsystem controller 52. However, if the subsystem controller 52 comprises a hard-wired logic circuit, the construction of the subsystem controller 52 can be simplified by arranging such that the closing operation with respect to the barrier is performed by the system controller 50.

As described above, according to the above embodiment, as mechanical preparation operations are performed in parallel with the start of the OS, the apparatus quickly enters a main-operation stand-by status within a short period. For example, in case of digital still camera, it can quickly enters an image sensing stand-by status.

Second Embodiment

Figure 6:
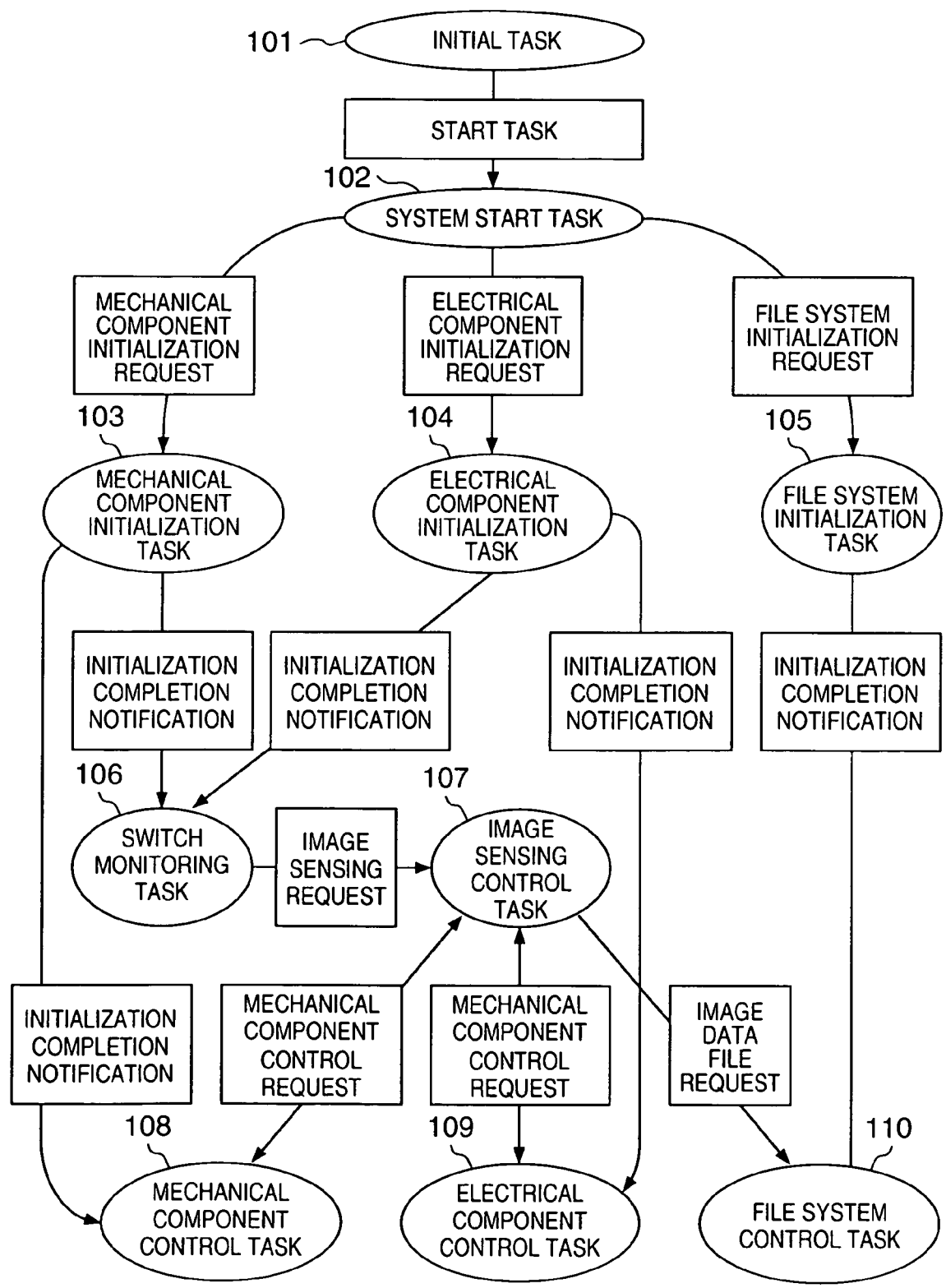
FIG. 6 is an explanatory view of the task structure and control flow of an apparatus according to a second embodiment of the present invention.
Figure 7:
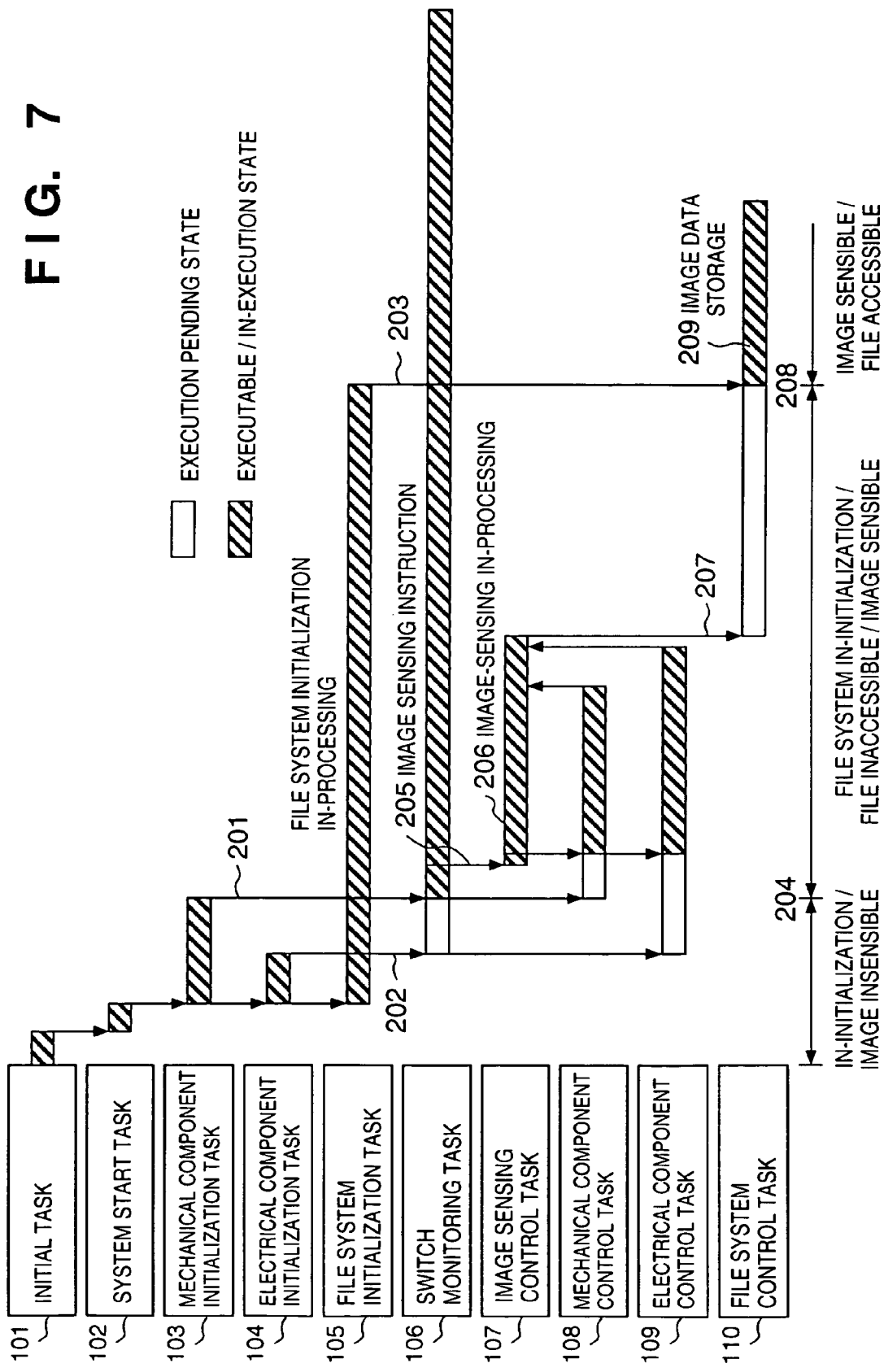
FIG. 7 is a timing chart of the operation of the second embodiment.
Figure 8:
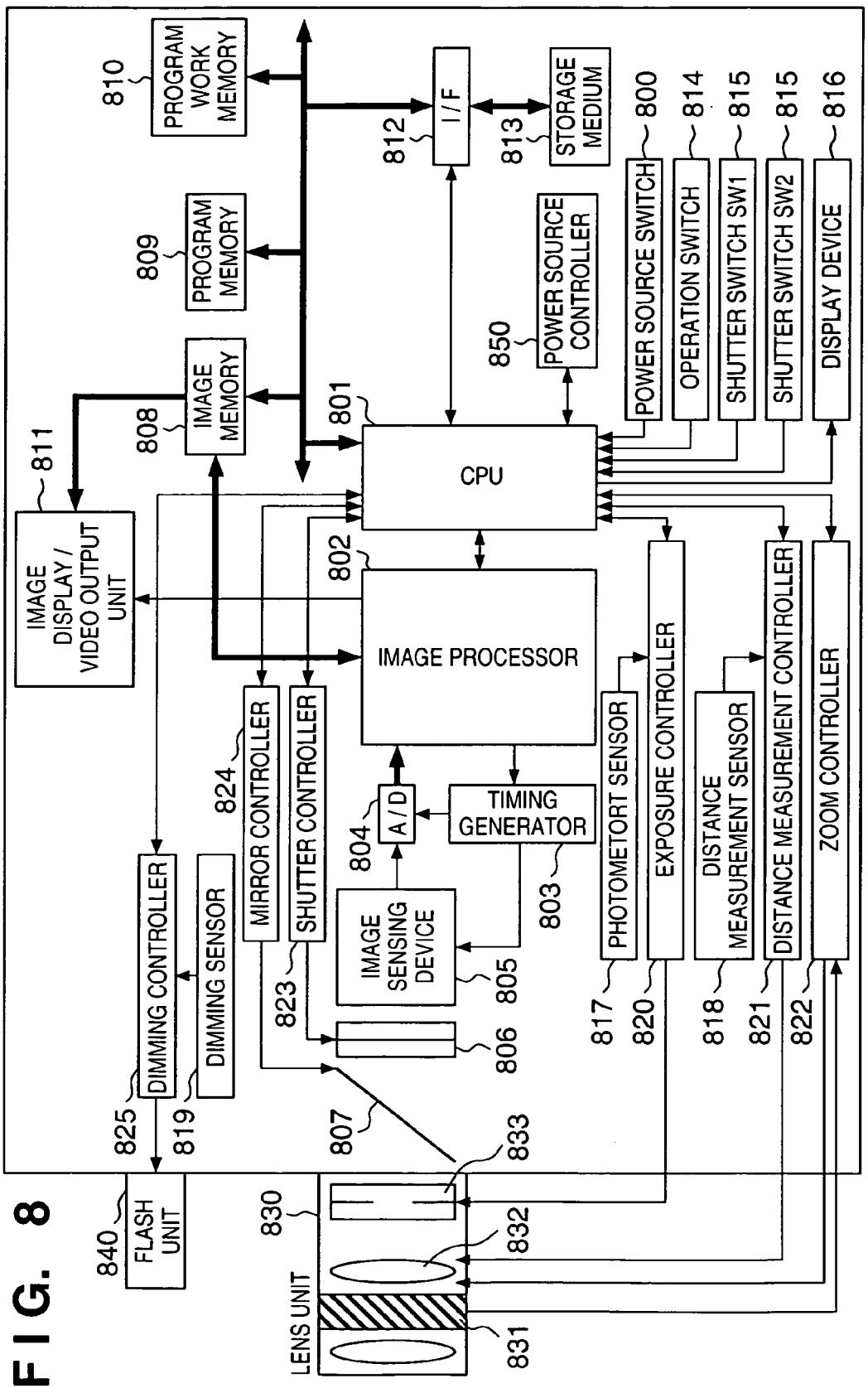
FIG. 8 is a block diagram of the construction of the apparatus according to the second and third embodiments.

FIG. 6 is an explanatory view showing the task structure and control flow of a digital camera according to a second embodiment of the present invention. FIG. 7 is a timing chart showing the operation from image sensing to file accessible state according to the present embodiment. FIG. 8 is a block diagram showing the system configuration of the digital camera as an image sensing device according to the present embodiment.

In FIG. 8, a lens unit 830 and a flash unit 840 are removably attached to the image sensing device.

When the power source switch 800 is turned on, the central processing unit (CPU) 801 for system control and file system control starts, and the CPU 801 turns on power supply to the respective blocks by a power source controller 850.

The CPU 801 simultaneously starts initialization of electrical components to perform signal processing, including an image processor 802 which performs image processing control, compression/expansion control, memory control and the like, an image memory 808, an image display/video output unit 811, and the like, initialization of mechanical components including an exposure controller 820, a distance measurement controller 821, a zoom controller 822, a shutter controller 823, a mirror controller 824, a dimming controller 825 and the like, initialization of a storage medium interface 812 and a storage medium 813, and initialization of a file system constructed on the storage medium 813.

In the present system configuration, the above-described initialization of the electrical components and the initialization of the mechanical components are completed within a short period (See mechanical components initialization task 103 and electrical components initialization task 104 in FIG. 7).

When the initialization of the electrical components and the initialization of the mechanical components have been completed, the operation switch 814 and the shutter switch 815 become active before the initialization of the file system is completed. Further, the zoom operation member 831 also becomes active at this time. When the user operates the zoom operation member 831, focal length change is notified via the zoom controller 822, and the CPU 801 drives a lens group 832 by the zoom controller 822.

When the shutter switch 815 is operated and a switch SW1 is turned on, the CPU 801 starts preparation for image sensing. The CPU 801 instructs the exposure controller 820 to obtain the current photometry information from a photometry sensor 817 and to calculate an exposure value. Further, the CPU 801 causes the distance measurement controller 821 to drive the lens group 832 while determining a focal position based on information from a distance measurement sensor 818.

Next, when the shutter switch 815 is operated and a switch SW2 is turned on, to perform actual image sensing, the CPU 801 drives the image processor 802 and a timing generator 803, and starts to control an A/D converter 804 and an image sensing device 805. Further, the CPU 801 controls the main mirror 807 by the mirror controller 824, controls an aperture 833 in correspondence with the current exposure value by the exposure controller 820, and performs shutter control to perform speed control on a shutter 806 in correspondence with the current exposure value, and further, controls drive of the flash unit 840 by the dimming controller 825 in accordance with necessity (flash illumination), so that the image sensing device 805 is exposed.

After the exposure of the image sensing device 805, electric charge accumulated at the image sensing device 805 is sequentially read and transmitted to the image processor 802 as digital image data in accordance with timing signals generated by the timing generator 803 (via the A/D converter 804). The image processor 802 performs development processing and compression processing on the image data read from the image sensing device 805, and temporarily stores the processed image data in the image memory 808. The image data temporarily stored in the image memory 808 can be viewed by using the image display/video output unit 811. Further, if the initialization of the file system has not been completed at this time, the image data is still stored in the image memory 808.

When the shutter switch 815 (switch SW1 or SW2) is operated next, the above control is repeated, and image sensing operation is performed until the image memory 808 is filled with image data.

If the initialization of the file system is completed when the image data is stored in the image memory 808, immediately the image data stored in the image memory 808 is written to the storage medium 813. When the writing is completed, the image data stored in the image memory 808 becomes invalid, and the area where the image data has been stored is used as an available area for next image sensing.

The image data writing is repeated as long as image data exists in the image memory 808 and the storage medium 813 has available space. Further, if the shutter switch 815 (switch SW1 or SW2) is operated while image data is being written in the storage medium, the image sensing operation is performed in parallel with the image writing.

Next, referring to FIG. 6, numeral 101 denotes an initial task which starts the entire system. The initial task 101 performs initialization to start the system, starts a task group constituting the system, and starts a system start task 102.

The system start task 102 issues a mechanical component initialization request to the mechanical component initialization task 103 which initializes the mechanical components, issues an electrical component initialization request to the electrical component initialization task 104 which initializes the electrical components, and issues a file system initialization request to a file system initialization task 105 to obtain information to store a file into a storage medium 813, from the storage medium 813.

A switch monitoring task 106 waits for an image sensing start instruction from the user. The switch monitoring task 106 does not start to monitor image sensing start instruction until it receives initialization completion notification from the mechanical component initialization task 103 and that from the electrical component initialization task 104. That is, in FIG. 7, at a point 204 where initialization completion notification 201 from the mechanical component initialization task 103 and initialization completion notification 202 from the electrical component initialization task 104 have been received, an image sensible status is obtained.

After the point 204 where the above-described image sensible status is obtained, the switch monitoring task 106 waits for an image sensing instruction, and in accordance with an image sensing instruction 205 by the user's operation, issues an image sensing request to an image sensing control task 107. The image sensing control task 107 enters an image sensing in-processing state 206, and issues a mechanical component control request for image sensing operation to a mechanical component control task 108, so as to control the mechanical components for AF operation, lens drive, aperture drive, shutter drive and the like.

Further, the image sensing control task 107 issues an electrical component control request for image sensing operation to an electrical component control task 109, so as to control the electrical components including the image sensing device, the A/D converter, a digital signal processor, storage means and the like. Upon reception of image sensing completion notification from the mechanical component control task 108 and that from the electrical component control task 109, the image sensing control task 107 issues an image data file request 207 to a file system control task 110.

The file system control task 110 receives the image data file request 207, and stores the request, as a request in a pending state, into temporary storage means during a period between the reception of the request and reception of initialization completion notification 203 from the file system initialization task 105 (from points 204 to 208 in FIG. 7). The file system control task 110 receives the initialization completion notification 203 from the file system initialization task 105, and stores image data obtained by image sensing as a file into the storage medium (209), in accordance with the image data file request 207 in the pending state.

It is necessary for the switch monitoring task 106 to receive the initialization completion notification from the mechanical component initialization task 103 and that from the electrical component initialization task 104 in order to enter the image sensible state. Actually, in comparison between the period necessary for the initialization of the mechanical components and the period necessary for the initialization of the electrical components, the longer of these periods is determined as the period necessary for obtaining the image sensible status.

In the second embodiment, the initialization of the mechanical components and the initialization of the electrical components are completed within a comparatively short period, and it is not necessary to wait for the initialization completion notification 203 from the file system initialization task 105. Accordingly, the period necessary for obtaining the image sensible status can be reduced.

Third Embodiment

Figure 9:
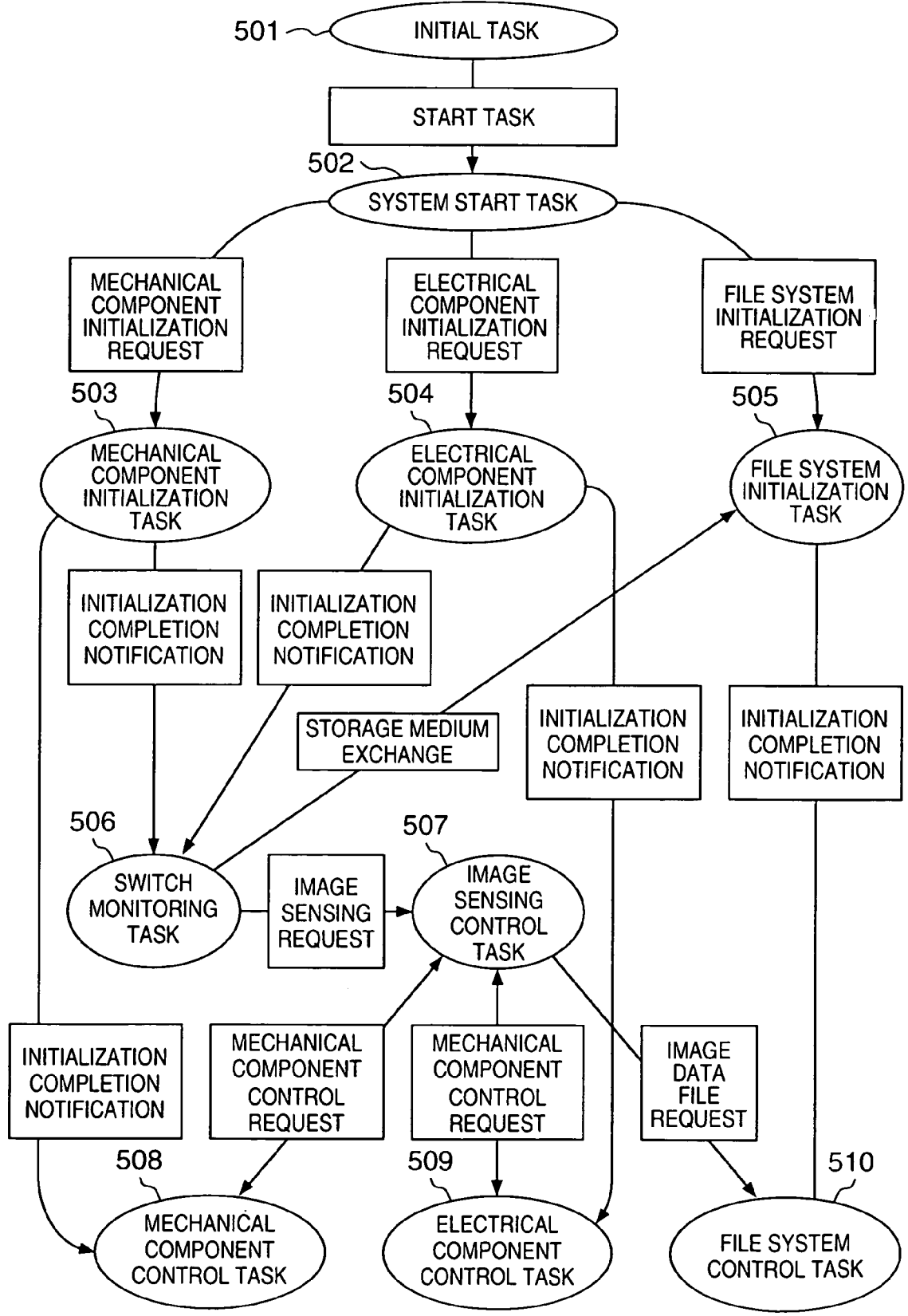
FIG. 9 is an explanatory view of the task structure and control flow of the apparatus according to the third embodiment of the present invention.
Figure 10:
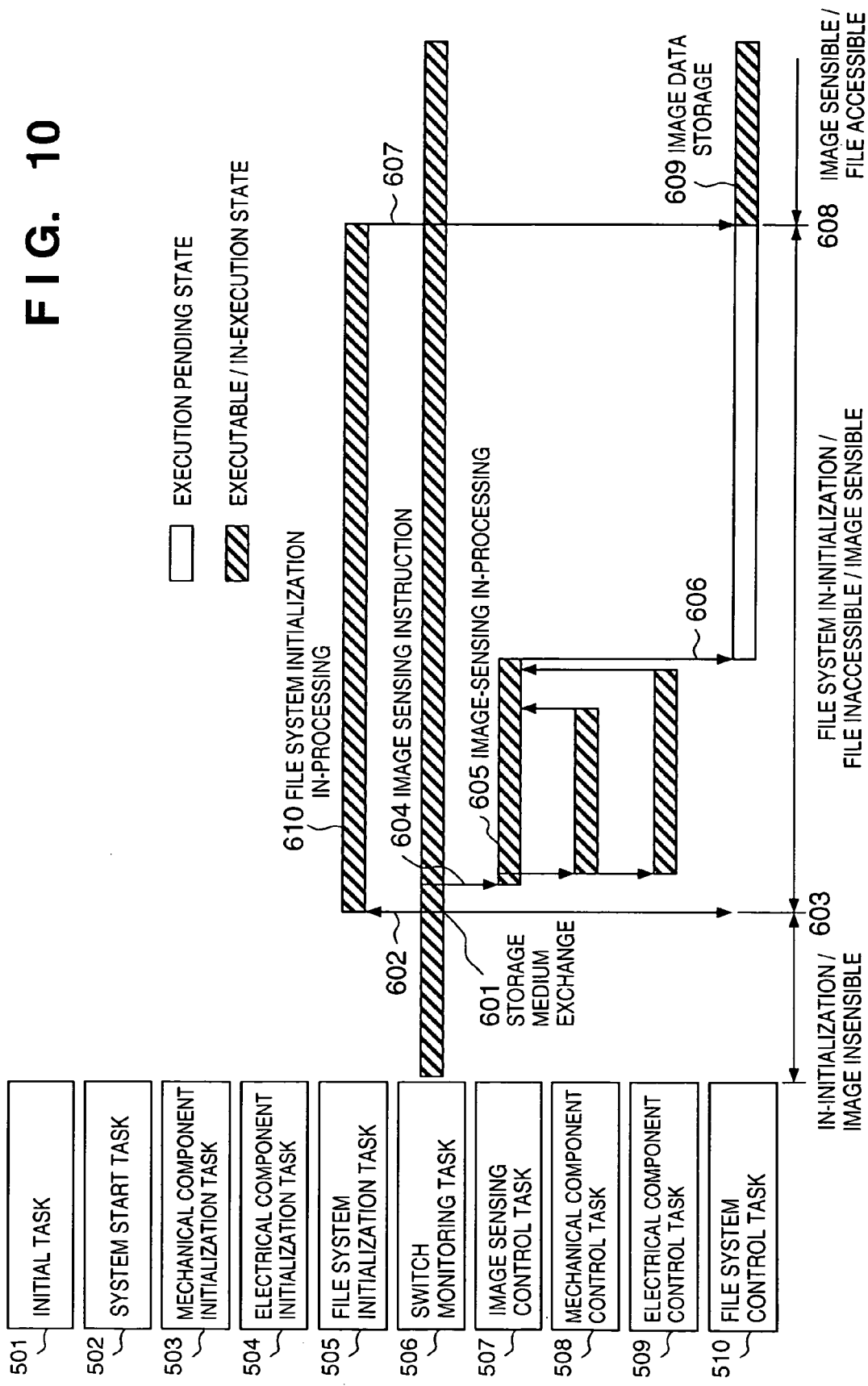
FIG. 10 is a timing chart of the operation of the third embodiment.

FIG. 9 is an explanatory view showing the task structure and control flow according to a third embodiment of the present invention. FIG. 10 is a timing chart showing the operation from image sensing upon storage medium exchange to acquisition of file accessible state according to the present embodiment. Note that the system configuration of the image sensing device of the present embodiment is the same as that shown in FIG. 8.

Referring to FIG. 9, numeral 501 denotes an initial task which starts the entire system. The initial task 501 performs initialization to start the system, starts a task group constituting the system, and starts a system start task 502.

The system start task 502 issues a mechanical component initialization request to the mechanical component initialization task 503 which initializes the mechanical components, issues an electrical component initialization request to the electrical component initialization task 504 which initializes the electrical components, and issues a file system initialization request to a file system initialization task 505 to obtain information to store a file into the storage medium 813, from the storage medium 813.

A switch monitoring task 506 waits for an image sensing start instruction from the user and detection of storage medium exchange. The switch monitoring task 506 does not start to monitor image sensing start instruction until it receives initialization completion notification from the mechanical component initialization task 503 and that from the electrical component initialization task 504. That is, at a point where the initialization completion notification from the mechanical component initialization task 503 and the initialization completion notification from the electrical component initialization task 504 have been received, the image sensible status is obtained.

Further, when the initialization by the file system initialization task 505 has been completed, the file system initialization task 505 issues initialization completion notification to a file system control task 510. The file system control task 510 enters a file accessible state.

In FIG. 10, when the switch monitoring task 506 detects exchange operation 601 of exchange of the storage medium 813 by the user, the switch monitoring task 506 issues storage medium exchange notification 602 to the file system initialization task 505 and the file system control task 510.

The file system initialization task 505 receives the storage medium exchange notification 602, and to read information on the storage medium (storage medium type, entire capacity of the storage medium, the capacity in current use, current available capacity, the file format, current latest file information and the like) directly from the storage medium, enters file system initialization in-execution state 610.

Further, the file system control task 510 enters a file inaccessible state. That is, from an operation point 603 of the storage medium exchange operation 601, the file system control task 510 enters the file system in-initialization/file inaccessible/image sensible state.

After the storage medium exchange operation point 603, an image sensing request by the user's operation is issued to the image sensing control task 507. The image sensing control task 507 enters an image sensing in-processing state 605, and issues a mechanical component control request for image sensing operation to a mechanical component control task 508, so as to control the lens, the aperture and the shutter. Further, the image sensing control task 507 issues an electrical component control request for image sensing operation to an electrical component control task 509, so as to control the image sensing device, the A/D converter, the digital signal processor and the storage means.

Upon reception of image sensing completion notification from the mechanical component control task 508 and that from the electrical component control task 509, the image sensing control task 507 issues an image data file request 606 to the file system control task 510. The file system control task 510 receives the image data file request 606, and stores the request, as a request in a pending state, into temporary storage means during a period between the reception of the request and reception of initialization completion notification 607 from the file system initialization task 505 (from points 603 to 608 in FIG. 10).

The file system control task 510 receives the initialization completion notification 607 from the file system initialization task 505, and stores image-sensed data as a file into the storage medium (609), in accordance with the image data file request 606 in the pending state.

As described above, according to the third embodiment, image sensing can be performed even while the file system is being initialized due to storage medium exchange, by the operations of the mechanical component control and the electrical component control.

Fourth Embodiment

Figure 11:
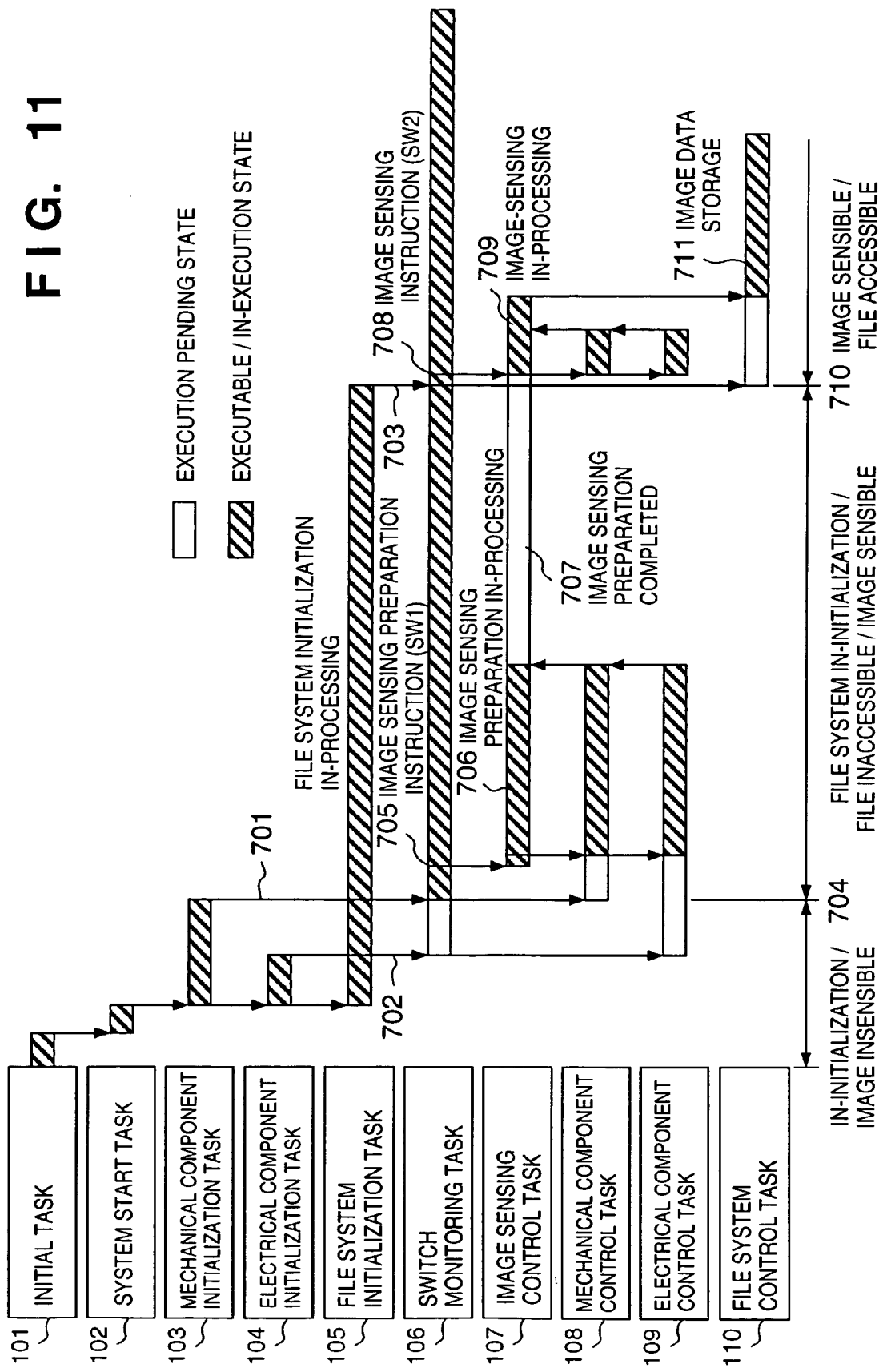
FIG. 11 is a timing chart of the operation of a fourth embodiment of the present invention.
Figure 12:
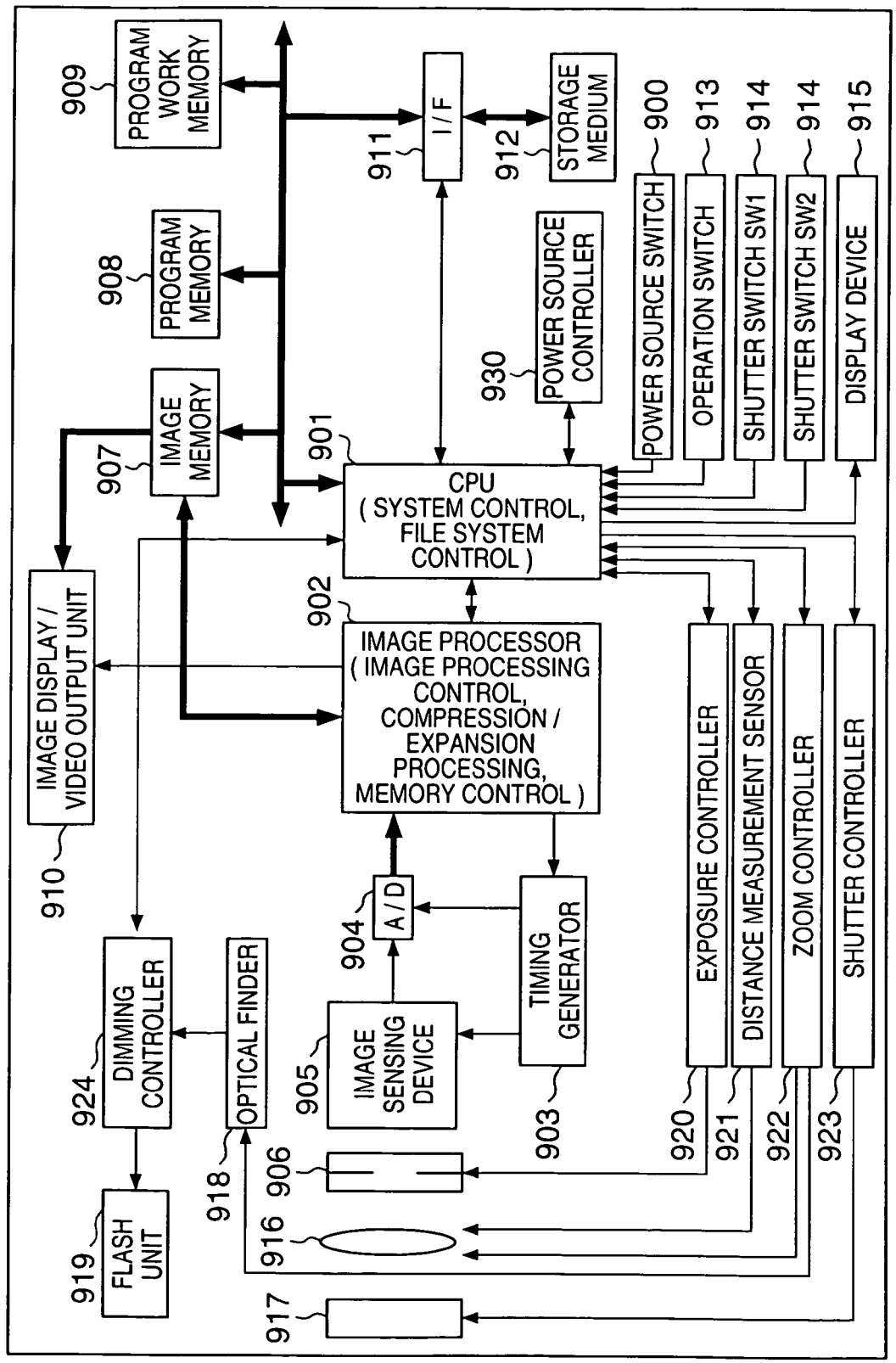
FIG. 12 is a block diagram of the construction of the apparatus according to the fourth embodiment.

FIG. 11 is a timing chart showing the operation from image sensing for acquisition of file accessible state according to a fourth embodiment of the present invention. FIG. 12 is a block diagram showing the system configuration of the digital camera as the image sensing device according to the fourth embodiment. Note that the task structure and control flow of the present embodiment are the same as those in FIG. 6, the detailed explanations of the task structure and the control flow will be omitted.

In FIG. 12, the digital camera incorporates a flash unit 919, and has a collapsible lens 916 and a lens barrier 917 to protect the lens.

When a power source switch 900 is turned on, a CPU 901 for system control and file system control starts, and the CPU 901 turns on power supply to the respective blocks by a power source controller 930. The CPU 901 simultaneously starts initialization of electrical components including an image processor 902 which performs image processing control, image compression/expansion control, memory control and the like, an image memory 907, an image display/video output unit 910, and the like, initialization of mechanical components including an exposure controller 920, a distance measurement controller 921, a zoom controller 922 and a barrier controller 923, initialization of a storage medium interface 911 and a storage medium 912, and initialization of a file system constructed on the storage medium 912.

In the present system configuration, the initialization of the electrical components is completed within a short period (See a mechanical component initialization task 104 in FIG. 11).

Upon initialization of the mechanical components, the barrier controller 923 opens the lens barrier 917, and in this state, the distance measurement controller 921 and the zoom controller 922 extend the lens group 916 to a predetermined position.

The exposure controller 920 moves a shutter and an aperture 906 to predetermined positions (See a mechanical component initialization task 103 in FIG. 11). When the initialization of the electrical components and the initialization of the mechanical components have been completed, an operation switch 913 and a switch SW1 of a shutter switch 914 become active before the initialization of the file system is completed.

Further, when the user operates a zoom operation member of the operation switch 913, the CPU 901 drives the lens group 916 and an optical finder 918 by the zoom controller 922.

When the switch SW1 of the shutter switch 914 is turned on, the CPU 901 starts preparation for image sensing. The CPU 901 drives the image processor 902, a timing generator 903, an A/D converter 904 and an image sensing device 905, controls an aperture 906 by the exposure controller 920, to expose the image sensing device 905. When the image sensing device 905 is exposed, electric charge accumulated at the image sensing device 905 is sequentially read and transmitted to the image processor 902 as digital image data by the timing generator 903 and the A/D converter 904.

The image processor 902 performs image processing on the image data read from the image sensing device 905, and stores the processed image data in the image memory 907. The image data stored in the image memory 907 can be viewed by using an image display/video output unit 910. Further, if the optical finder 918 is used, the image data cannot be written into the image memory 907 and the image data cannot be viewed on the image display/video output unit 910.

Further, the distance measurement controller 921 drives the lens group 916 while determining the focal position based on information from the image processor 902 and a distance measurement sensor. In this state, when the switch SW2 of the shutter switch 914 is turned ON, image sensing can be immediately performed.

When the initialization of the file system has been completed, the switch SW2 of the shutter switch 914 also becomes active, thus all the switches are active.

When the switch SW2 of the shutter switch 914 is turned on, as the distance measurement has been completed and the mechanical elements of the optical system such as the lens group 916 is in the focal position, the CPU 901 immediately performs image sensing. The CPU 901 drives the image processor 902, the timing generator 903, the A/D converter 904, the image sensing device 905, and controls the aperture 906 by the exposure controller 920, to expose the image sensing device 905.

After the exposure of the image sensing device 905, electric charge accumulated at the image sensing device 905 is sequentially read and transmitted to the image processor 902 as digital image data via the A/D converter 904 in accordance with timing signals generated by the timing generator 903 and the A/D converter 904. The image processor 902 performs development processing and compression processing on the image data read from the image sensing device 905, and temporarily stores the image data into the image memory 907. The image data temporarily stored in the image memory 907 can be viewed by the image display/video output unit 910.

The image data stored in the image memory 907 is immediately written into the storage medium 912. When the writing has been completed, the image data stored in the image memory 907 becomes invalid, and the area where the image data has been stored is used as an available area for next image sensing. Further, when the image data is written into the storage medium, if the shutter switch 914 (switch SW1 or SW2) is operated, image sensing is performed in parallel to the image writing.

As described above, according to the fourth embodiment, during the file system initialization processing, the optical mechanical components are operated to perform the lens-zoom operation, the AF operation and the AE operation. Thus, even if image sensing is instructed immediately after the completion of file system initialization, the image sensing operation (the aperture control, the shutter control and the image sensing control) can be immediately performed.

Note that in the above second to fourth embodiments, a plurality of microcomputers may be used as the controller to simultaneously perform the mechanical component initialization operation, the electrical component initialization operation and the file system initialization operation.

Further, to simultaneously perform the above respective initialization operations, a realtime multi-task monitoring system using interrupt processing from the respective initialization operation may be employed.

Further, to simultaneously perform the above respective initialization operations, the mechanical component initialization operation and the electrical component initialization operation may be performed during idle time in data transfer from the storage medium by DMA (Direct Memory Access) upon file system initialization operation.

Further, to simultaneously perform the above respective initialization operations, the mechanical component initialization operation and the electrical component initialization operation may be performed by time-division processing.

Further, the object of the present invention can also be achieved by providing a storage medium storing program code for performing the aforesaid processes to a computer system or apparatus (e.g., a personal computer), reading the program code, by a CPU or MPU of the computer system or apparatus, from the storage medium, then executing the program.

In this case, the program code read from the storage medium realizes the functions according to the embodiment, and the storage medium storing the program code constitutes the invention.

Further, the storage medium, such as a floppy disk, a hard disk, an optical disk, a magneto-optical disk, a CD-ROM, a CD-R, a magnetic tape, a nonvolatile type memory card, and a ROM can be used for providing the program code.

Furthermore, besides aforesaid functions according to the above embodiment are realized by executing the program code which is read by a computer, the present invention includes a case where an OS or the like working on the computer performs a part or entire processes in accordance with designation of the program code and realizes functions according to the above embodiment.

Furthermore, the present invention also includes a case where, after the program code read from the storage medium is written in a function expansion card which is inserted into the computer or in a memory provided in a function expansion unit which is connected to the computer, a CPU or the like contained in the function expansion card or unit performs a part or entire processes in accordance with designation of the program code and realizes functions of the above embodiment.

Figure 5:
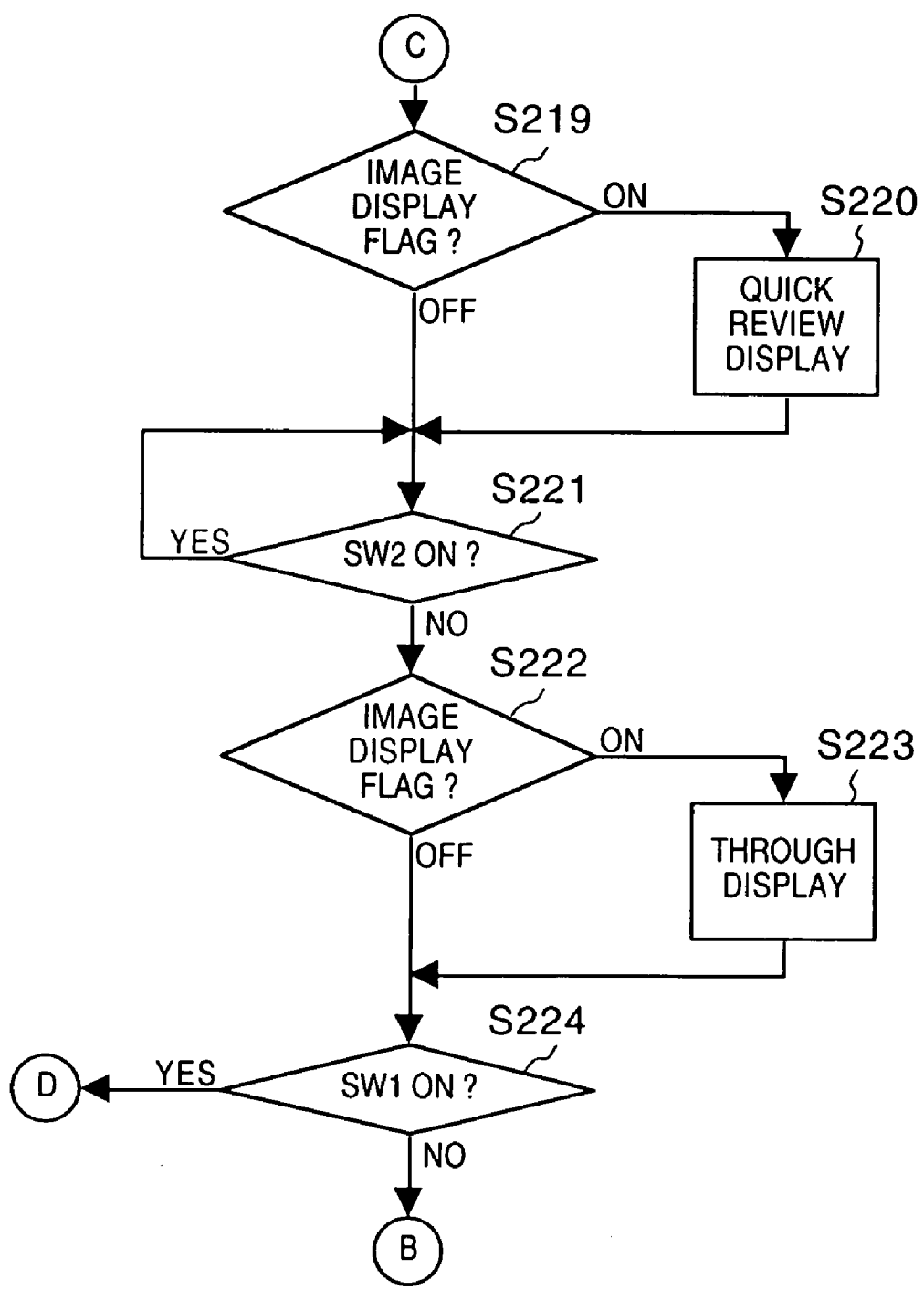

In a case where the present invention is applied to the aforesaid storage medium, the storage medium stores program code corresponding to the flowcharts in FIGS. 3 to 5 described in the first embodiment and the task structures shown in FIGS. 6 and 9 described in the second to fourth embodiments.

The present invention is not limited to the above embodiments and various changes and modifications can be made within the spirit and scope of the present invention. Therefore, to apprise the public of the scope of the present invention, the following claims are made.

What is claimed is:

1. An electronic device comprising:
   a first system controller configured to control an image sensing operation of the electronic device with an operating system; and
   a second system controller configured to control a mechanical operation of a lens barrel of the electronic device, which, in response to a turn-on operation of a power source associated with said second system controller exclusively, extends the lens barrel having a lens from a collapsed position, starts supplying power to said first system controller, and operates independently of said first system controller,
   wherein said second system controller is further configured to continue extending the lens barrel while said first system controller launches the operating system in response to a start of the power source initiated by said second system controller.

2. The electronic device according to claim 1, wherein said first system controller is a central processing unit, and wherein in a first system controller drive signal operation, immediately after turning on of the power source to said first system controller, said first system controller starts the operating system, and operates a control application program.

3. The electronic device according to claim 1, wherein if a completion of a first system controller drive signal operation has not been notified within a predetermined period since the turning on of the power source to said first system controller, said second system controller returns said first system controller to a status before the power source was turned on to said first system controller, and turns off the power source to said first system controller.

4. The electronic device according to claim 3, wherein said predetermined period is longer than a period from turning on of the power source to said first system controller to normal completion of the first system controller drive signal operation.

5. The electronic device according to claim 1, further comprising an operation unit which inputs an operation instruction to the electronic device, wherein if no operation instruction has been inputted by said operation unit within a predetermined period, said second system controller returns said lens barrel to a status before the power source was turned on to said first system controller, and turns off the power source to said first system controller.

6. The electronic device according to claim 1, wherein said second system controller is a central processing unit and is always powered.

7. The electronic device according to claim 6, wherein said second system controller controls the power source to said first system controller.

8. The electronic device according to claim 1, wherein said second system controller is a hard-wired logic circuit.

9. The electronic device according to claim 1, wherein said first system controller has a processing speed faster than that of said second system controller.

10. The electronic device according to claim 1, wherein electric consumption of said second system controller is lower than that of said first system controller.

11. The electronic device according to claim 1, wherein the electronic device is a digital still camera.

12. The electronic device according to claim 11, wherein said lens barrel protects the optical system of the digital still camera.

13. The electronic device according to claim 12, wherein said second system controller opens said lens barrel in parallel to a first system controller drive signal operation on an overall device.

14. The electronic device according to claim 11, wherein said lens barrel includes a collapsible barrel of the digital still camera.

15. The electronic device according to claim 14, wherein said second system controller extends said collapsible barrel in parallel to a first system controller drive signal operation on an overall device.

16. The electronic device according to claim 1, wherein the electronic device has an in-use status and a non-use status different from each other, and wherein said second system controller controls said lens barrel in parallel to a first system controller drive signal operation on an overall device, so as to cause the device to enter the in-use status from the non-use status.

17. The electronic device according to claim 16, wherein the electronic device is a digital still camera and comprises an image sensing lens as said lens.

18. The electronic device according to claim 17, wherein when the device is not used, the device is in an image sensing disabled status in which said image sensing lens is collapsed into a camera main body.

19. The electronic device according to claim 17, wherein when the device is used, the device is in an image sensing enabled status in which said image sensing lens is extended from a camera main body to a wide-angle side position.

20. The electronic device according to claim 17, wherein said lens barrel protects said image sensing lens.

21. The electronic device according to claim 20, wherein when the device is used, the device is in an image sensing enabled status in which the lens barrel that protects said image sensing lens is opened.

22. The electronic device according to claim 20, wherein when the device is not used, the device is in a image sensing disabled status in which the lens barrel that protects said image sensing lens is closed.

23. A method for controlling an electronic device having a first system controller configured to control an image sensing operation of the electronic device with an operating system and a second system controller configured to control a mechanical operation of a lens barrel of the electronic device, which, in response to a turn-on operation of a power source associated with said second system controller exclusively, extends the lens barrel having a lens from a collapsed position, starts supplying power to said first system controller, and operates independently of said first system controller, said method comprising the steps of:
 continuing extending the lens barrel by said second SYSTEM controller while said first system controller launches the operating system in response to a start of the power source initiated by said second system controller.

24. The method according to claim 23, wherein said first system controller is a central processing unit, and wherein when the second system controller starts supplying power to the first system controller, an OS (Operating System) is started and a control application program is operated after turning on of the power source to said first system controller.

25. The method according to claim 23, further comprising:
 a step of returning said lens barrel to a status before the power source was turned on to said first system controller if the completion of a driving step has not been notified from said second system controller within a predetermined period since turning on of the power source to said first system controller; and
 a step of turning off the power source to said first system controller.

26. The method according to claim 25, wherein said predetermined period is longer than a period from turning on of the power source to said first system controller to normal completion of the driving step by said second system controller.

27. The method according to claim 23, wherein the electronic device further comprises an operation unit which inputs an operation instruction to the electronic device, the method further comprising:
 a step of returning said lens barrel to a status before the power source was turned on to said first system controller if no operation instruction has been inputted within a predetermined period; and
 a step of turning off the power source to said first system controller.

28. The method according to claim 23, wherein the electronic device is a digital still camera.

29. The method according to claim 28, wherein said lens barrel protects an optical system of the digital still camera, and wherein at when the second system controller starts supplying power to the first system controller, said lens barrel is opened.

30. The method according to claim 28, wherein said lens barrel includes a collapsible barrel of the digital still camera, and wherein at when the second system controller starts supplying power to the first system controller, said collapsible barrel is extended.

31. The method according to claim 23, wherein the electronic device has an in-use status and a non-use status different from each other, and wherein when the second system controller starts supplying power to the first system controller, control to cause the device to enter the in-use status from the non-use status is performed.

32. The method according to claim 31, wherein the electronic device is a digital still camera, and comprises an image sensing lens as said lens.

33. The method according to claim 32, wherein when the electronic device is not used, the device is in the non-use status in which said image sensing lens is collapsed in a camera main body.

34. The method according to claim 32, wherein when the electronic device is used, the device is in the in-use status in which said image sensing lens is extended from a camera main body to a wide-angle side position.

35. The method according to claim 32, wherein said lens barrel protects said image sensing lens.

36. The method according to claim 35, wherein when the electronic device is used, the device is in the in-use status in which the lens barrel that protects said image sensing lens is opened.

37. The method according to claim 35, wherein when the electronic device is not used, the device is in the non-use status in which the lens barrel that protects said image sensing lens is closed.

38. A computer program product comprising a computer usable medium having computer readable program code means embodied in said medium and executed by a controller for controlling an electronic device having a first system controller configured to control an image sensing operation of the electronic device with an operating system and a second system controller configured to control a mechanical operation of a lens barrel of the electronic device, which, in response to a turn-on operation of a power source, extends the lens barrel having a lens from a collapsed position, starts supplying power to said first system controller, and operates independently of said first system controller, said product including:
 computer readable program code means for continuing extending the lens barrel while said first system controller launches the operating system in response to a start of the power source initiated by said second system controller.

39. The computer program product according to claim 38, wherein the electronic device has an in-use status and a non-use status different from each other, and wherein when the second system controller starts supplying power to the first system controller, control to cause the device to enter the in-use status from the non-use status is performed.

40. An image sensing apparatus comprising:
 image sensing means for converting an optical image of an object to electric signals and outputting the electric signals;
 control means for controlling the image sensing device with an operating system;
 mechanical drive means, in resposne to a turn-on operation of a power source associated with said mechanical drive means exclusively, for extending a lens barrel having a lens from a collapsed position, for starting supplying power to said control means, and for operating independently of said control means;
 signal processing means for generating image signals by processing the electric signals outputted from said image sensing means;
 file system means for storing the image data generated by said signal processing means to a storage medium; and wherein said mechanical drive means is configured to continue extending the lens barrel while said control means launches the operating system in response to a start of the power source initiated by said mechanical drive means.

41. The image sensing apparatus according to claim 40, wherein initialization of said file system means controlled by said control means includes an operation of obtaining information on said storage medium from said storage medium.

42. The image sensing apparatus according to claim 41, wherein the information in said storage medium includes at least one of storage medium type, entire capacity of the storage medium, capacity in current use, current available capacity, the file format, current latest file information.

43. The image sensing apparatus according to claim 40, wherein said mechanical drive means includes at least either of a lens drive unit or an exposure drive unit.

44. The image sensing apparatus according to claim 40, wherein said control means adopts by a real time multi task monitoring system for performing various initialization operation.

45. The image sensing apparatus according to claim 41, wherein said control means simultaneously performs the initialization with said mechanical drive means by performing data transmission from said storage medium by said file system means at the initialization by direct memory access (DMA), and said mechanical drive means and signal processing means perform initialization during idle time of the DMA.

* * * * *

UNITED STATES PATENT AND TRADEMARK OFFICE
CERTIFICATE OF CORRECTION

PATENT NO. : 7,129,984 B1
APPLICATION NO. : 09/414104
DATED : October 31, 2006
INVENTOR(S) : Okada et al.

It is certified that error appears in the above-identified patent and that said Letters Patent is hereby corrected as shown below:

In the Specification:

In col. 19, lines 18-19, please replace "SYSTEM" with --system--.

Signed and Sealed this

Sixth Day of February, 2007

JON W. DUDAS
*Director of the United States Patent and Trademark Office*